United States Patent [19]

Schramm

[11] 4,099,057

[45] Jul. 4, 1978

[54] X-RAY DIAGNOSTICS GENERATOR FOR X-RAY PHOTOGRAPHS

[75] Inventor: Franz Schramm, Moehrendorf, Germany

[73] Assignee: Siemens Aktiengesellschaft, Berlin & Munich, Germany

[21] Appl. No.: 785,734

[22] Filed: Apr. 8, 1977

[30] Foreign Application Priority Data

Jun. 10, 1976 [DE] Fed. Rep. of Germany ....... 2626083

[51] Int. Cl.² ............................................... G03B 41/16

[52] U.S. Cl. ................................ 250/416 R; 250/402; 250/408

[58] Field of Search ................... 250/401, 402, 416 R, 250/408, 409, 410

[56] References Cited

U.S. PATENT DOCUMENTS

| | | | |
|---|---|---|---|
| 2,147,424 | 2/1939 | Beschoff | 250/413 |
| 3,163,757 | 12/1964 | Transen | 250/416 R |

*Primary Examiner*—Craig E. Church

*Attorney, Agent, or Firm*—Hill, Gross, Simpson, Van Santen, Steadman, Chiara & Simpson

[57] ABSTRACT

In the illustrated embodiment the mAs indicator has a rectangular window for exposing a printed mAs value in accordance with discrete settings of x-ray tube current and photographic exposure time. The x-ray tube current selection controls a mask with a stepped series of small apertures which successively register with different portions of the mAs indicator window. The exposure time selection may control the angular position of a cylinder which positions successive rows of mAs product values with the mAs indicator window, such that the particular mAs value which is visible through the aligned mask aperture will represent the product of the x-ray tube current setting and the exposure time setting. In the illustrative embodiment, the mask comprises a flat plate which is driven in response to angular movement of the x-ray tube current selector knob by means of a pin and slot opening. The cylinder is driven by means of the rotary exposure time selector knob by means of a simple cord drive.

3 Claims, 4 Drawing Figures

X-RAY DIAGNOSTICS GENERATOR FOR X-RAY PHOTOGRAPHS

BACKGROUND OF THE INVENTION

The invention relates to an x-ray diagnostics generator system for x-ray photographs comprising manually actable adjustment means for the x-ray tube voltage, the x-ray tube current, and the photographic exposure time, and comprising indicator means for the mAs-product resulting from the adjusted x-ray tube current and the adjusted exposure time.

In the case of a known x-ray diagnostics generator of this type, an automatic calculator system is provided for the so-called three-head operation wherein the three values: x-ray tube voltage, x-ray tube current, and photographic exposure time, are individually continuously adjustable. The automatic calculator system determines the mAs-product for each adjusted value of the x-ray tube current and the photographic exposure time, and effects its visual indication. Thus, the user is enabled to read off the resulting mAs product for each adjusted combination of exposure values. However, the construction of the automatic calculator system is complicated and expensive.

SUMMARY OF THE INVENTION

The object which is the basis of the invention consists in designing an x-ray diagnostics generator system of the type initially cited such that its construction is greatly simplified as compared with the known x-ray diagnostics generator, particularly regarding the means effecting the visual indication of the mAs-product.

As specified by the invention, this object is achieved in that sets of discrete values are programmed for the x-ray tube current and the exposure time, respectively, one value from each of these sets being selectable in each particular instance by the adjustment means, that the indicator means for the mAs-product contains a rotatably mounted cylinder on which all adjustable mAs-values are recorded in row and column fashion such that, at a specified exposure time, the mAs-values, resulting in accordance with the adjustable mA -values, are in one line or row axially of the cylinder, that the cylinder is mechanically coupled with the adjustment means for the exposure time such that it can be rotated, and that the cylinder is covered by an apertured mask adjustable by the adjustment means for the x-ray tube current, said apertured mask having a number of holes corresponding to the number of selectable mAs-values, said holes being so constructed and arranged that, in each mask-position, one hole reveals the resulting mAs-value. In the inventive x-ray diagnostics generator, an automatic calculator system for determining the respective mAs-value is eliminated. Pre-programming of specific values for the exposure time and the x-ray tube current provides the possibility of recording all the possible mAs-values on the cylinder and then effecting a visual indication of the particular resulting mAs value through the apertured mask.

Other objects, features and advantages of the present invention will be apparent from the following detailed description taken in connection with the accompanying sheets of drawings.

DETAILED DESCRIPTION

Figure 1:
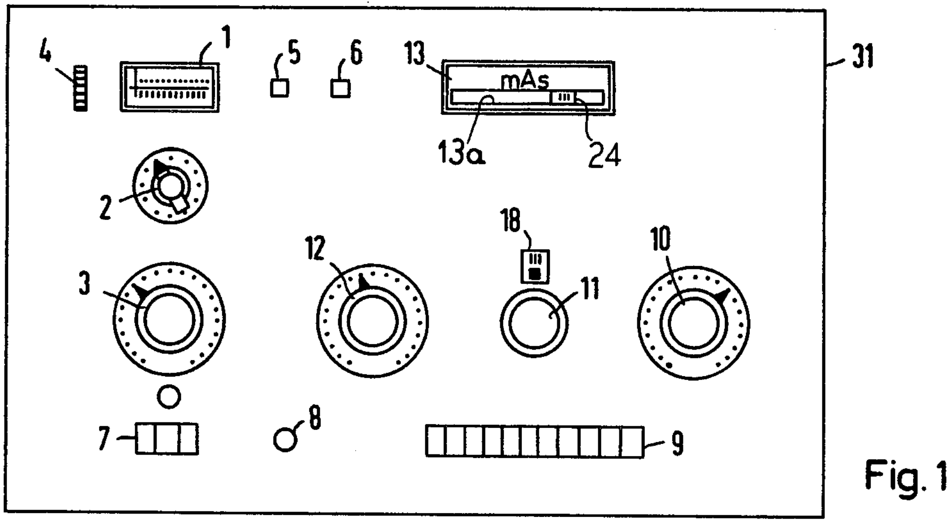
FIG. 1 illustrates a plan view of a control panel for an x-ray diagnostics generator system according to the present invention.

The control desk according to FIG. 1 is provided with a current meter 1, a fluoroscopy timer control 2, an adjusting knob 3 for the fluoroscopy x-ray tube voltage, an adjusting knob 4 for the fluoroscopy-x-ray tube current, as well as additional control and indicator means 5, 6, 7, 8, and 9, for the purpose of fluoroscopy and photographing. In addition, FIG. 1 shows an adjusting knob 10 for adjusting the x-ray tube voltage for the photographic exposure, an adjusting knob 11 for adjusting the x-ray tube current for the photographic exposure, and an adjusting knob 12 for the photographic exposure time. The visual indication of the mAs-product resulting from the adjusted values of photographic exposure time and x-ray tube current proceeds in an indicator field 13.

Figure 2:
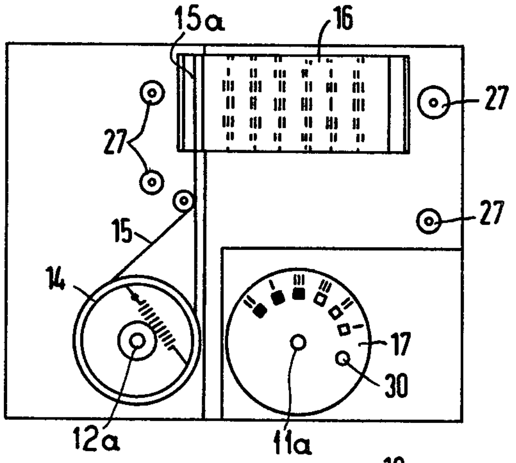
FIG. 2 is a diagrammatic plan view of certain parts underlying the control panel of FIG. 1 and forming part of the mAs indicator means.

FIG. 2 illustrates the control desk according to FIG. 1 with the cover plate removed. Fixedly connected with the shaft 12*a* of the knob 12 for the photographic exposure time is a sheave 14, over which a cord 15 is guided. The cord is coupled in driving relation to cylinder 16 at 15*a*. Cylinder 16 carries in rows and columns all mAs product values which are selectable by means of knobs 11 and 12. Sets of discrete values are programmed for the x-ray tube current and the photographic exposure time, respectively. Thus it is possible to select six values by means of knob 11 and to select 24 different photographic exposure times by means of knob 12. Accordingly, cylinder 16 has 24 lines or rows each disposed parallel to its axis of rotation and six different mAs values in each line. A window 13*a* (FIG. 1 of indicator field 13 has its longitudinal center line overlying the axis of rotation of cylinder 16 so that one row of mAs values registers with window 13*a* in each angular position of cylinder 16. In FIG. 2, an additional disc 17 is apparent which is fixedly connected with shaft 11*a* of knob 11 and which carries six possible mA-values. The particular selected mA value is indicated in a window 18 (FIG. 1) of cover plate 31.

Figure 3:
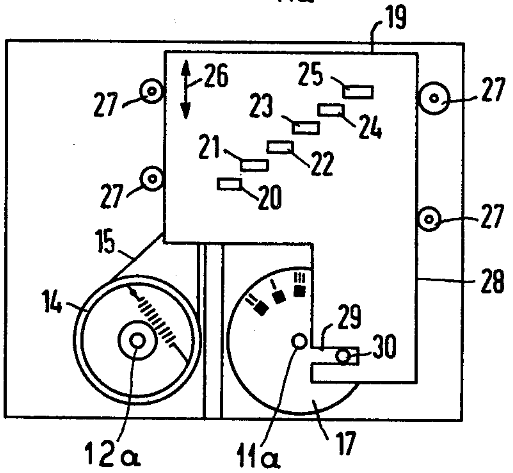
FIG. 3 is a diagrammatic plan view similar to FIG. 2 but showing an apertured mask in operative association with the cooperating parts shown in FIG. 2.

In order that only a particular mAs-value can be indicated which results from the selected photographic exposure time and the selected x-ray tube current, cylinder 16, according to FIG. 3, is covered by an apertured mask 19. Apertured mask 19 has six holes 20 through 25 and, with the aid of knob 11, is capable of displacement under the guidance of rollers 27 in a direction perpendicular to the axis of cylinder 16; i.e. in the direction of double arrow 26. The holes of the apertured mask 19 are arranged such that one hole at a time is aligned with window 13*a* of the indicator field 13 of cover plate 31 (FIG. 1) of the control desk. For this purpose, the window 13*a* of indicator field 13 is constructed as a rectangular aperture having a length corresponding to the distance between the outer margins of the holes 20 and 25 which are furthest removed from another, and whose width corresponds to the width of each of the holes 20 through 25. Since holes 20 through 25 according to FIG. 3 are staggered in a stepped formation, it is thus possible for always only one hole to appear in indicator field 13. Accordingly, there is always only one mAs-value indicated. Holes 20 through 25 are constructed and arranged such that, in each position of apertured mask 19, that particular hole which is in indicator field 13 reveals the mAs-value resulting from the adjusted photographic exposure time and the adjusted mA-value.

For adjustment, apertured mask 19 which is constructed as a flat plate, has an extension 28 in which a slot 29 is provided. In slot 29, which runs parallel to the longitudinal direction of cylinder 16, a pin 30 is displaceably guided which is secured with disc 17. Thus, upon rotating knob 11, apertured mask 19 is displaced in the direction of double arrow 26, the pin 30 sliding in slot 29 and converting the arcuate motion of knob 11 into linear movement of the apertured mask 19.

In the inventive x-ray diagnostics generator, the number of selectable mAs-values is fixed on account of the programming of constants for the photographic exposure time and the x-ray tube current. They are recorded on cylinder 16, for example, on a paper band placed about said cylinder, and these mAs values, corresponding to the particular given adjustments for the photographic exposure time and the x-ray tube current, are visually indicated by means of apertured mask 19. An arithmetic unit which calculates the mAs-value corresponding to the selected values for the photographic exposure time and for the x-ray tube current is not necessary. Thus, the visual indication of the mAs-values proceeds in an extraordinarily simple manner. It is possible to interchangeably arrange the band containing the mAs values on cylinder 16 so that the programming of constants for the photographic exposure time and the x-ray tube current may proceed according to the respective requirements, by simply selecting the corresponding type of band for attachment to cylinder 16.

Figure 4:
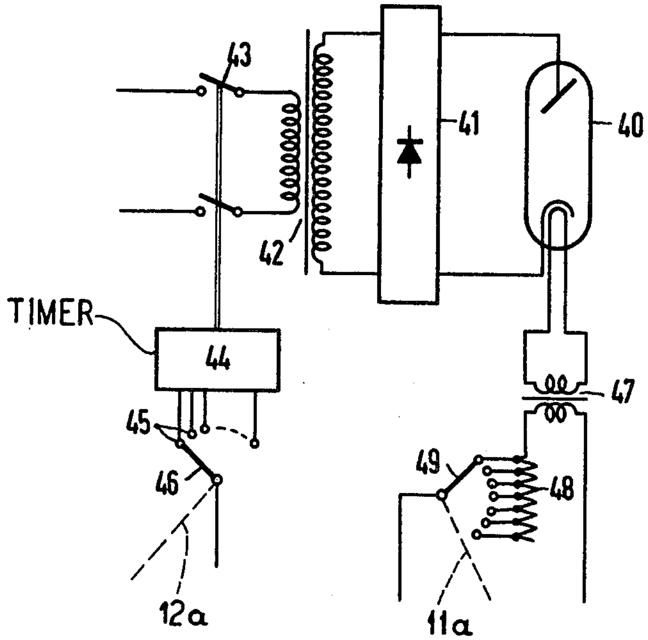
FIG. 4 illustrates a circuit diagram having discrete selector means for operation by the manual controls of FIG. 1.

FIG. 4 illustrates a circuit diagram of the x-ray diagnostics generator according to FIGS. 1 through 3. From FIG. 4, it is apparent that an x-ray tube 40 is fed by a high voltage transformer 42 via a high voltage rectifier 41. The primary winding of the high voltage transformer 42 can be connected to the feed mains supply via a switch 43. Switch 43 is actuated by a time switching device or timer 44 for the purpose of switching x-ray tube 40 on and off. Time switching device has several inputs 45, one of which being connectable in each instance to a voltage by a selector 46. Each of the inputs 45 is associated with a specific photographic exposure time, respectively. Selector 46 can be actuated by knob 12, via shaft 12*a* as indicated by the dash line 12*a* in FIG. 4.

Heating of x-ray tube 40 proceeds via a filament transformer 47 which is connected to the mains supply via a resistance 48. Resistance 48 has a plurality of taps, which are connectable to the mains supply via a selector 49 in conformity with the x-ray tube current desired in each particular instance. Knob 11 may be coupled with selector 49 as indicated by dash line 11*a* in FIG. 4.

From FIG. 4 it is apparent that a number of constants for the photographic exposure time is programmed with the aid of time switching device 44, and that a number of constants for the x-ray tube current is programmed with the aid of resistance 48.

It will be apparent that many modifications and variations may be effected without departing from the scope of the novel concepts and teachings of the present invention.

I claim as my invention:

1. An x-ray diagnostics generator system for x-ray photographs comprising manually actuatable adjustment means for the x-ray tube voltage, the x-ray tube current, and the photographic exposure time, and comprising indicator means for the mAs-product resulting from the adjusted x-ray tube current and the adjusted photographic exposure time, characterized in that the manually actuatable adjustment means for the x-ray tube current and the photographic exposure time are operable to select respective sets of discrete values of x-ray tube current and photographic exposure time with each setting of exposure time corresponding to a set of mAs product values corresponding to the possible discrete values of x-ray tube current, the indicator means for the mAs product comprising a rotatably mounted cylinder with the respective sets of mAs product values recorded in successive rows about the cylinder and with each product value of a given row being aligned with a corresponding product value of other rows to form a column circumferentially about the cylinder with product values corresponding to a given x-ray tube current setting, the cylinder being mechanically coupled with the adjustment means for the photographic exposure time and being rotatable to a position with a row of product values aligned with the indicator means in accordance with the setting of exposure time, the indicator means further having an apertured mask adjustable by the adjustment means for the x-ray tube current and having apertures for selectively exposing the respective columns of product values in accordance with the setting of x-ray tube current, the apertures of the mask being constructed and arranged that, in each mask position, one aperture is positioned to expose the correct mAs product value at the indicator means.

2. An x-ray diagnostics generator system according to claim 1, characterized in that the apertured mask is in the form of a flat plate mounted for movement perpendicular to the axis of rotation of the cylinder.

3. An x-ray diagnostics generator system in accordance with claim 2, characterized in that the apertured mask has an extension provided with a slot running parallel to the cylinder axis, the adjustment means for the x-ray tube current comprising a rotary knob having a pin rotatable therewith and engaged in the slot for translating the arcuate movement of the rotary knob into linear movement of the apertured mask at right angles to the cylinder axis.

* * * * *